Dec. 29, 1959 J. A. ORAM 2,918,904
SERVO MOTOR WITH ADJUSTABLE STIFFNESS CONTROL MEANS
Filed April 27, 1956 3 Sheets-Sheet 1

JOHN A. ORAM *Inventor*

By *Darby & Darby*
  *Attorneys*

Dec. 29, 1959   J. A. ORAM   2,918,904
SERVO MOTOR WITH ADJUSTABLE STIFFNESS CONTROL MEANS
Filed April 27, 1956   3 Sheets-Sheet 3

United States Patent Office 2,918,904
Patented Dec. 29, 1959

2,918,904

SERVO MOTOR WITH ADJUSTABLE STIFFNESS CONTROL MEANS

John A. Oram, Aylesbury, England, assignor to Air Trainers Link Limited, Aylesbury, England Application April 27, 1956, Serial No. 581,024

Claims priority, application Great Britain April 28, 1955

13 Claims. (Cl. 121—41)

This invention relates to load-sensitive devices.

More specifically, the invention relates to load-sensitive devices incorporating mechanical springs the "stiffness" or resistance to load of which is required to be progressively variable while they are under load. Such springs are required, for example, in ground aviation trainers where they are connected to rudder pedals or to the flight control column so that, on deflection of these controls, the springs apply to the loads representing the aerodynamic hinge moments of the relevant control surfaces of the supposed aircraft.

It is an object of the invention to provide such a device wherein the "stiffness" of the mechanical spring can be varied by very simple means while the spring is under load.

Another object of the invention is to provide a load-sensitive device wherein the "stiffness" of the mechanical spring is controlled hydraulically.

A further object of the invention is to provide a load-sensitive device wherein both adjustment of the datum of the spring and the variation of the stiffness of the spring is effected by one and the same servo-motor.

Yet another object of the invention is to provide a load-sensitive device which is of use in the control of the flight control surfaces of an actual aircraft.

According to the invention, the spring is connected at one end to an anchorage through a position-controlled servo-motor having a position controlling element which is connected to the other end of the spring through a linkage of adjustable ratio so that movement of said other end under the influence of a load applied to the spring results in the anchored end of the spring being moved to an extent determined by the adjustment of the adjustable-ratio linkage.

The adjustment of the said linkage (which may be made manually or through a small motor) accordingly varies the resistance of the spring to the load applied to it. Where the ratio of the linkage is unity, the anchored end of the spring moves as much as the loaded end, so that the spring itself is not stressed beyond the small initial amount necessary to make the servo-motor move, and thus offers negligible resistance to the load, as will be explained more fully below.

The position-controlled servo-motor can take many forms and preferably comprises an hydraulic ram. In the same way, the nature of the adjustable-ratio control linkage is a matter of choice and may, for example, be an electrical or electronic system, particularly where the length of the connecting member is varied electrically. By suitable adaptation of the adjustable-ratio control linkage, the servomotor may readily be made to perform the additional and independent duty of adjusting the datum of the spring, that is to say, the free position of its loaded end when the applied load is zero. In ground aviation trainer applications, this corresponds to the charges in the natural trailing angle of a hinged control surface due to the adjustment of a trim tab or to the changes in direction of its local air flow during angular motions of the aircraft. The dual function of the servo-motor gives a definite advantage over the arrangements in general use to-day having a servo-motor for varying the effective stiffness of a spring by adjusting the fulcrum point of a lever system through which the external load is applied to the spring, as it is difficult or impossible in such arrangements to avoid having to provide a second and more powerful servo-motor for adjustment of the "no-load" datum of the spring when this is called for.

In order that the invention may be thoroughly understood, an example of a load-sensitive device in accordance with it will now be described with reference to the accompanying drawings, in which.

Figure 1:
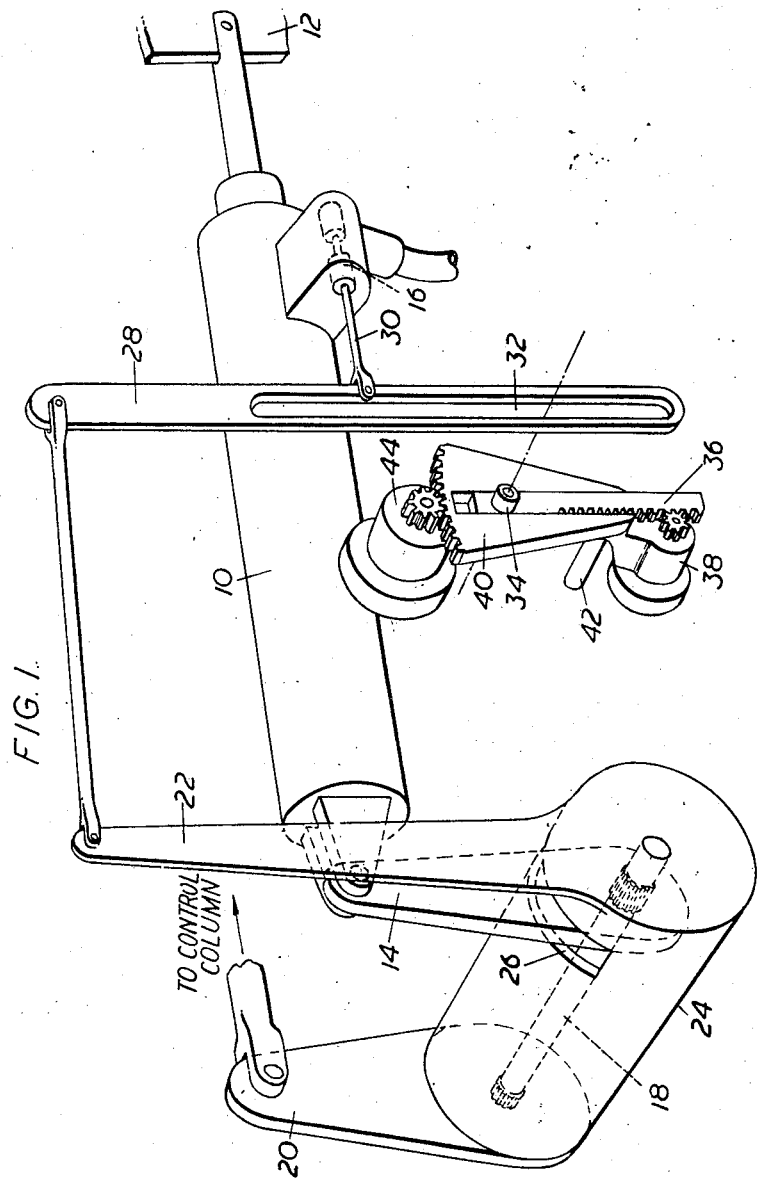
Figure 1 shows a perspective view of the device which is designed for use in a ground aviation trainer.

The device comprises an hydraulic ram 10 pivotally connected at one end to a rigid anchorage or support 12 and pivotally connected at the other end to a lever 14. The supply and exhaust of hydraulic fluid to and from the ram is regulated by a conventional slide-valve 16 arranged on the side of the ram in conventional manner so that the ram body follows the valve movement within very small limits. Thus if a pull is exerted on lever 20, in the direction indicated by the arrow in Fig. 1, lever 22, which is rigidly connected to lever 20 by rigid cylindrical connection 24, will rotate clockwise as viewed in Fig. 1, thereby causing lever 28 to rotate clockwise about pivot 34. Assuming that pivot 34 is located on the opposite side of lever 28 from the upper link connecting levers 22 and 28, it will be seen that clockwise rotation of lever 28 will move valve rod 30 toward the right, as viewed in Fig. 1. If slot 32 is made to extend upward past rod 30 and pivot 34 is moved up past rod 30, clockwise rotation of lever 28 will cause leftward movement of rod 30. In either case, it may be seen that for a given amount of motion of lever 22, the magnitude of the resultant movement of rod 30 depends upon the position of pivot 34. The force applied at lever 20 also is transmitted through spring or torsion bar 18 and lever 14, tending to move ram 10 rightwardly as viewed in Fig. 1. The ram, however, is fixedly attached to anchorage 12, and will not move in the absence of displacement of control valve 16. The deflection of spring 18, of course, is dependent upon the magnitude of the force applied to lever 20 by the trainee. Since connecting rod 30, which carries the slide of valve 16 is displaced relative to ram 10, which carries the body of valve 16, the slide will be moved away from its centered or balanced position. As soon as valve 16 is moved even a very slight distance from its balanced condition, hydraulic fluid will be admitted to the left end of the ram and released from the right end, thereby causing the ram casing 10 to move rightwardly as viewed in Fig. 1 relative to the piston (not shown) inside the ram, which piston is rigidly connected to grounded anchorage 12. Since considerable hydraulic pressure may be applied to the ram upon occurrence of minute valve unbalances if a sensitive valve is used, only a minute rightward displacement of the valve 16 is necessary to cause the ram to move. As ram 10 moves rightwardly in Fig. 6, it will be seen that it moves the body of valve 16 relative to connecting rod 30, thereby tending to re-enter or re-balance the valve. As soon as ram 10 has moved sufficiently to re-center valve 16, the valve will, of course, stop the ram movement.

The lever 14 is rigidly fixed to a torsion bar 18 which passes through it and which is fixed securely at the end further away from the lever 14 to a control lever 20. The lever 20 is connected at its upper end by a linkage (not shown) to either one of the main flying controls of the trainer. The other end of the torsion bar 18 is located in a bearing in a third lever 22 which is rigidly attached to the control lever 20 by a cylindrical connection 24 having a circumferential slot 26 through which the intermediate lever 14 projects. The whole torsion bar, cylinder and lever assembly is pivoted freely on its centre line.

The upper end of the lever 22 is linked to a valve-operating lever 28 which, as its name suggests, is designed to vary the position of the valve 16 through the link 30. The valve-operating lever 28 is provided with a slot 32 in its lower half and can swing about a movable pivot pin 34 which fits into this slot. The pin 34 is carried on a rack 36 which meshes with a cog-wheel carried on the shaft of a small motor 38. A sector 40 carries the motor and the rack, and is pivotally mounted on a shaft 42. The sector has teeth at its upper circumferential edge which mesh with a cog-wheel driven by another electric motor 44.

When the trainee moves the control which is connected to lever 20 he meets the resistance of the ram through the torsion bar 18. This torsion bar connection between the control lever 20 and the lever 14 however permits a small relative displacement between the two levers. The rigid cylindrical connections between the control lever 20 and the third lever 22 causes the last-mentioned lever also to be displaced relatively to the lever 14. The movement of the lever 22 is transmitted to the valve-operating lever 28 which swings about its pivot 34 and thus moves the valve 16 relatively to the ram 10. According to the direction of movement of the valve 16, the ram begins to increase or decrease in length so that subsequent movement of the control lever 20 is effected by the ram through the lever 14 and the torsion bar 18. If a force is exerted in the direction indicated by the arrow in Fig. 1, connecting rod 30 moves rightwardly and ram 10 shortens, assuming pivot 34 is located within the shortened slot 32 of Fig. 1. If an opposite force is exerted, connecting rod 30 will move leftwardly and ram 10 will lengthen, again assuming a pivot 34 location such as shown in Fig. 1.

The ratio of ram and thus lever 14 movement to input and valve lever movement (levers 20 and 22) can be altered by moving pivot 34 in the slot 32. When located near the bottom of slot 32, the pivot 34 will be in line with the shaft 42, and in this condition the linkage is such that the ratio is unity, since levers 22 and 28 then are of substantially equal effective length. The torsion bar need only be deflected a very small amount to open the valve and the mechanism imparts no loads of any consequence on the particular control.

At the other extreme the pivot 34 is at the end of the slot 32 nearest to the point at which the valve link 30 is attached to the lever 28. In this condition the ratio of valve and thus ram movement to input movement is small and it is necessary to deflect the torsion bar through angles that are a large proportion of the input lever 20 angular movement.

If the slot 32 is so arranged that the pivot 34 can coincide with the point at which the valve link 30 is attached to the lever 28, no valve movements can result from control movements, and the stiffness imparted to the control is that of the torsion bar which has its end fixed by lever 14 being rigidly held by the hydraulic ram. Furthermore, if the slot 32 is extended above the point 30, at which the valve link is attached, movement of the pivot 34 above the point 30 will result in the ram moving in the sense to give greater torsion bar deflections than would occur in the ram locked case.

Thus, movement of pivot 34 in slot 32 results in changes of stiffness of the control from some datum. This can simulate the changes in stiffness resulting from variations in speed in an aircraft. Operation of the invention may be readily understood by analogy to a system which could substitute different springs. Assuming ram 10 to be inoperative and locked in place, it will be seen that the force $F_1$ required to provide a given displacement $\delta$ of lever 20 will be directly proportional to the spring rate of torsion bar 18. With the ram locked, the lever 20 end of bar 18 will rotate a given number of degrees, which, for convenience in explanation, may be termed $\delta$ degrees, but the lever 22 end of bar 18 will not rotate at all. Thus the force $F_1$ required to rotate lever 20 through $\delta$ degrees is that force required to "wind up" torsion bar 18 through $\delta$ degrees.

Now assume that ram 10 is not locked in place, but instead that it slides freely upon application of forces to it by lever 14, in the manner that it would operate if emptied of hydraulic fluid. It will be seen that the force required to displace lever 20 through $\delta$ degrees is only that minute amount required to move the mass of the system and overcome the friction of the piston in ram 10, and since lever 14 is free to rotate through the same angles as lever 20, no force is required to "wind-up" torsion bar 18 to achieve displacement of lever 20 through $\delta$ degrees.

In between these two conditions of "ram locked" and "ram freely movable" it will be seen that varying amounts of force would be required to allow a given input displacement of lever 20. Thus the ram may be seen to control the amount of rotation of the lever 14 end of torsion bar 18 to determine how much the torsion bar 18 must be wound up for any desired input displacement. This may be seen to be analogous to variations of spring length or spring rate. In the "ram locked" case the system acts in accordance with the actual length of torsion bar 18. If the ram slides so that lever 14 is allowed to rotate as much as lever 20, an infinitely long spring is simulated.

How much lever 14 is allowed to rotate for a given input displacement of lever 20, how much torsion bar 18 must be wound up, and hence how much force is required to perform the given displacement of lever 20, are governed by the position of pivot 34.

If pivot 34 is located opposite link 30, no movement of valve 16 results from displacement of lever 20, and ram 10 is effectively locked in place, so that lever 14 does not rotate, and the force required to provide any input displacement of lever 20 is equal to the force required to wind up torsion bar 18 through the required number of degrees. If pivot 34 is located at the bottom of slot 32, a very small displacement of lever 20 is required to move the ram 10, allowing the lever 14 end of torsion bar 18 to rotate, to follow the lever 20 end of the bar. If pivot 34 is located in between the two limits, it should be obvious that something between zero force and maximum force is required to provide any given input displacement.

In a real aircraft the datum to which the control returns when left free varies according to trim control setting and the conditions of flight. For example, the position which the rudder pedals of an aircraft will assume if the pilot exerts no forces on them depends on the nature of the airflow over the aircraft rudder surface as well as rudder trim setting. If the aircraft is yawing or sideslipping, for example, the rudder will assume a different position than for straight flight, everything else being assumed equal. Means are known in the grounded aircraft trainer art for computing the simulated zero control load position of the various control surfaces for different simulated flight conditions, and a voltage computed in known manner may be applied to position a conventional position servo motor 44. This is simulated in the device shown in Figure 1 by arranging a trim motor 44 which positions itself according to the computed zero control load position and moves the sector 40 about its shaft 42 by means of a pinion on the motor shaft.

When there is no pilot's load exerted on the control it will be found that the lever 28 will cause the servo to position itself and lever 28 so that, irrespective of the position of pivot 34 valve 16 is balanced, and, the lower end of the slot 32 is central over the centre-line of shaft 42.

Thus it will be seen that movement of pivot 34 will not alter the free position of the control. Furthermore, when the stiffness is at zero and pivot 34 coincident with shaft 42, trim changes can be selected but will have no effect until pivot 34 is moved away from the zero stiffness position.

Figure 2:
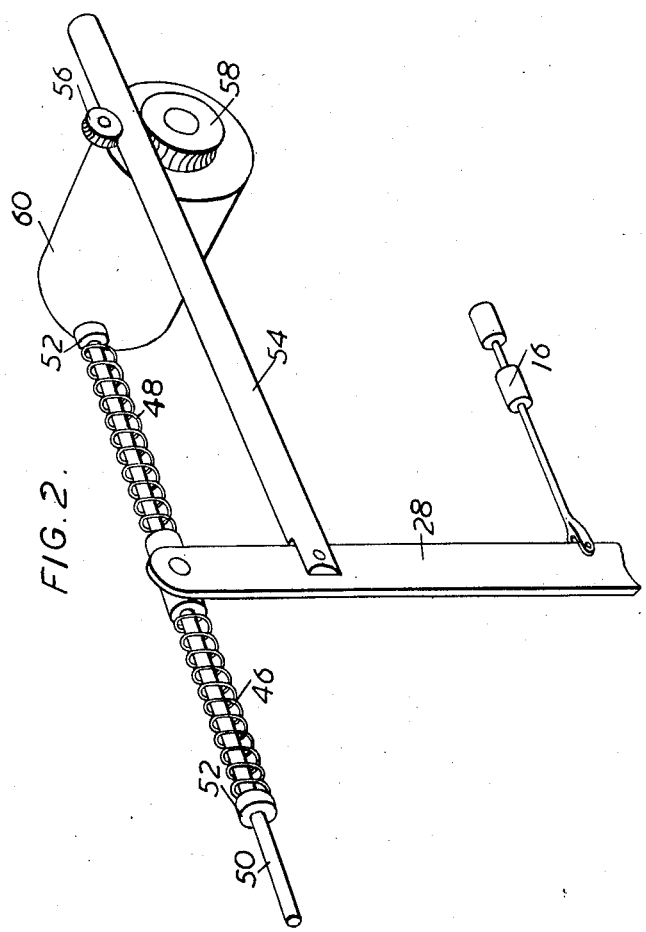
Figure 2 shows the modification required by the device of Figure 1 to simulate auto pilot control.

Figure 2 shows what modification must be made to the device of Figure 1 to simulate auto-pilot control. With such control, it is important to reproduce the violent jump of the control column (or rudder bar) which occurs in a real aircraft when the auto-pilot control disengaged with one of the control surfaces considerably out of trim at the moment of disengagement. The modification described in Figure 2 reproduces this violent jump very effectively.

Instead of a simple rigid connection between the two levers 22 and 28 as shown in Figure 1, the lever 28 is centred between two springs 46, 48. These springs slide on a rod 50 connected at one end to the lever 22 and having a pair of collars 52. The position of the valve-operating lever 28 is varied in accordance with auto-pilot control by means of a link 54 which can be moved when the clutch roller 56 presses it into the V-grooved, friction roller 58 of the auto-pilot servo-motor 60.

The springs 46 and 48 are deflected by the action of the auto-pilot servo-motor 60 whenever the control position demanded by this servo-motor differs from the trim or zero load position of the control. The extent and sense of this trim error, normally displayed by an indicator on the aircraft, can be measured by the deflection of one or other of the springs 46 and 48 and made to operate such an indicator.

If there were any trim error, the lever 28 would, on release of the link 54 by the auto-pilot servo-motor, be suddenly returned to its normal central position relative to link 50 and this would result in the control suddenly moving to the normal zero load position.

It will be appreciated that this auto-pilot input can only be used under conditions where the pivot 34 is sufficiently far from the valve link attachment point on the lever 28 so that the movement of the latter about the pivot pin gives the desired hydraulic ram movement.

Figure 3:
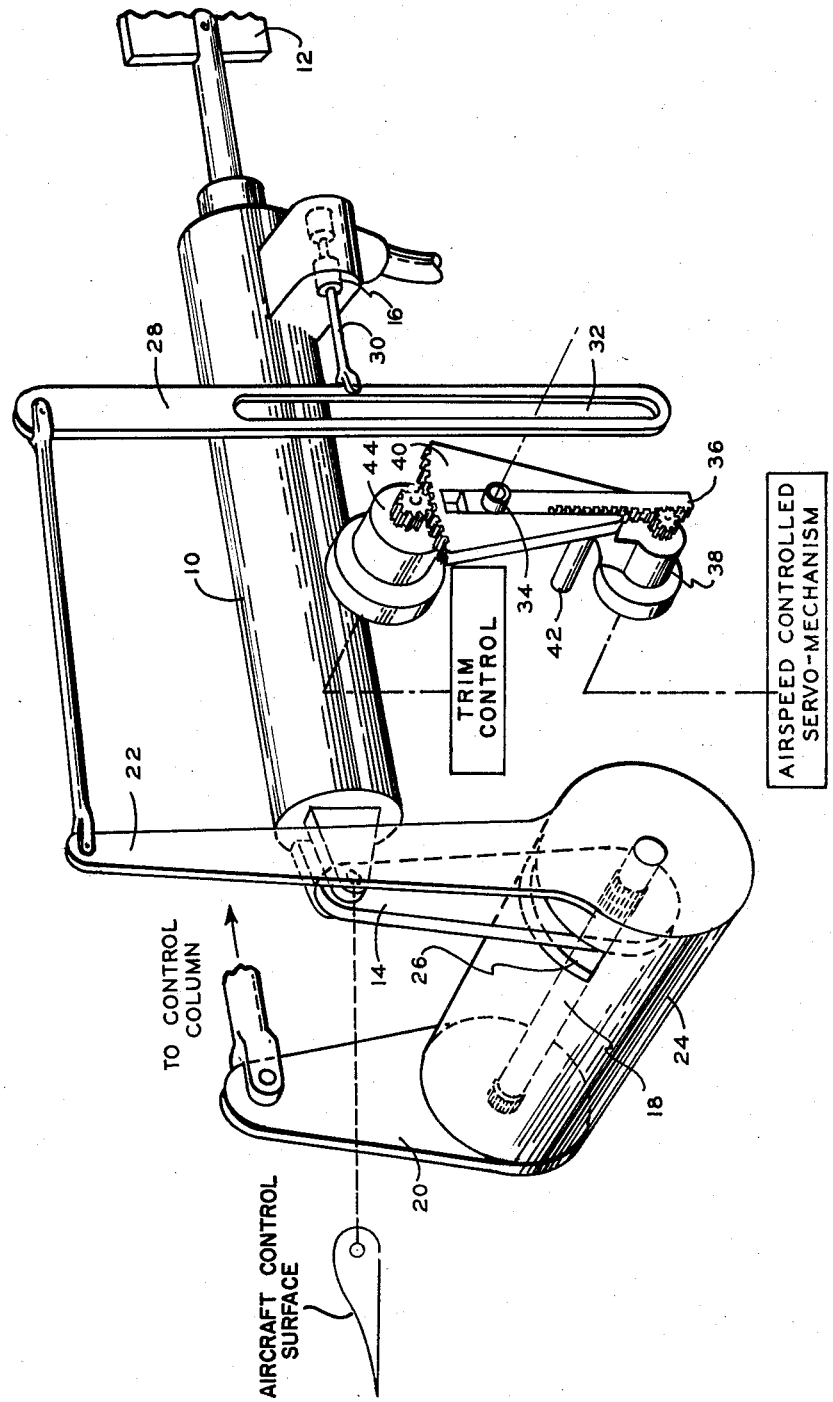
Figure 3 illustrates an exemplary embodiment of the invention connected to operate a control surface of an actual aircraft.

The invention may with advantage be applied to actual aircraft in cases where the flying control surfaces are power actuated, and a simulation of air loads upon the pilot's hands and feet is therefore required to aid him in smoothness of control and to guard against overstressing of the aircraft. Such an application is shown in Fig. 3, wherein an actual aircraft control surface is mechanically connected to be positioned by hydraulic ram 10, as indicated by the dashed line connecting the pivot point between arm 14 and ram 10 to the aircraft control surface. Where the invention is so applied it is possible, in the manner shown, to operate the control surface from the anchored end of the spring, with the control column connected to the free end of the spring 18, as shown, so that the servo-motor serves also as the power operator of the control surface. If, in addition, arrangements are made for the stiffness control of the system to be automatically adjusted with airspeed, the arrangement will have the additional inherent advantage that the apparent gear ratio between the pilot's movements and the control surface deflections will automatically vary in a desirable sense. That is to say, the increasing effective stiffness as speed rises will be accompanied by an increasing delicacy of control because the anchored end of the spring moves less and less for full deflection of the pilot's control. In Fig. 3 an airspeed-controlled servo-mechanism is shown connected to effect adjustment of rack 36. Since it is only at low speeds that full deflections of control surfaces are used, this is a very desirable arrangement, and by suitably choosing the law of change of stiffness with airspeed the optimum grading of the effect in question can readily be achieved for aircraft of differing characteristics. It will be seen that movement of rack 36 in accordance with airspeed will adjust the position of pivot 34 in slot 32 and thus vary stiffness of control. The trim control input shown in Fig. 3 as being applied via a motor 44 serves to determine ram "zero-position" in exactly the same manner as previously discussed above in connection with Fig. 1.

It will thus be seen that the objects set forth above, among those made apparent from the preceding description, are efficiently attained, and since certain changes may be made in the above constructions without departing from the scope of the invention, it is intended that all matter contained in the above description or shown in the accompanying drawing shall be interpreted as illustrative and not in a limiting sense.

I claim:

1. A load-sensitive device comprising a torsion spring, an hydraulic ram, a rigid connection between one end of said spring and one end of said ram, another connection between the other end of said ram and an anchorage, a valve member on said ram for controlling the supply and exhaust of hydraulic fluid to and from said ram, a linkage between said valve member and the other end of said spring, a lever forming part of said linkage, a pivotal mounting for said lever, and means for moving said pivotal mounting.

2. A load-sensitive device comprising a torsion spring, an hydraulic ram, a rigid connection between one end of said spring and one end of said ram, another connection between the other end of said ram and an anchorage, a valve member on said ram for controlling the supply and exhaust of hydraulic fluid to and from said ram, a linkage between said valve member and the other end of said spring, a lever forming part of said linkage, a pivotal mounting for said lever, a slot in said lever wherein said pivotal mounting is arranged to slide, and motor means for moving said pivotal mounting longitudinally of said slot.

3. A load-sensitive device comprising a torsion spring, an hydraulic ram, a rigid connection between one end of said spring and one end of said ram, another connection between the other end of said ram and an anchorage, a valve member on said ram for controlling the supply and exhaust of hydraulic fluid to and from said ram, a linkage between said valve member and the other end of said spring, a lever forming part of said linkage, a pivotal mounting for said lever, a rack carrying said pivotal mounting, and driving means for moving said rack.

4. A load-sensitive device comprising a torsion spring, an hydraulic ram, a rigid connection between one end of said spring and one end of said ram, another connection between the other end of said ram and an anchorage, a valve member on said ram for controlling the supply and exhaust of hydraulic fluid to and from said ram, a linkage between said valve member and the other end of said spring, a lever forming part of said linkage, a pivotal mounting for said lever, a straight rack carrying said pivotal mounting, a gear sector carrying said straight rack, guide means on said gear sector whereby said rack may be moved relatively to said gear sector, and driving means for rotating said gear sector through a restricted arcuate distance.

5. A load-sensitive device comprising spring means, a position-controlled servo-motor, a position-controlling element on said servo-motor, an anchorage, a rigid connection between said anchorage and said servo-motor, a rigid connection between said spring means and said servo-motor, linkage means connecting said position-controlling element to said spring means at a point on said spring means displaced from said connection between said spring means and said servo-motor, means whereby a load may be applied to said spring means, said linkage means being of adjustable ratio.

6. A load-sensitive device comprising a spring means, position-controlled servo-motor, a position-controlling element on said servo-motor, an anchorage, a rigid connection between said anchorage and said servo-motor, a rigid connection between said spring means and said servo-motor, linkage means connecting said position-controlling element to said spring means at a point on said spring means displaced from said connection between said spring means and said servo-motor, means whereby a load may be applied to said spring means, a lever forming part of said linkage means, a pivotal mounting for said lever, and means for moving said pivotal mounting relatively to the longitudinal axis of said lever.

7. A load-sensitive device comprising spring means, a position-controlled servo-motor, a position-controlling element on said servo-motor, an anchorage, a rigid connection between said anchorage and said servo-motor, a rigid connection between said spring means and said servo-motor, linkage means connecting said position-controlling element to said spring means at a point on said spring means displaced from said connection between said spring means and said servo-motor, means whereby a load may be applied to said spring means, a lever forming part of said linkage means, connecting means between one end of said lever and said spring means, a movable fulcrum for said lever, connecting means displaced from said fulcrum and said one end of said lever, said last-mentioned connecting means connecting said lever to said position-controlling element.

8. A load-sensitive device comprising spring means, a position-controlled servo-motor, a position-controlling element on said servo-motor, an anchorage, a rigid connection between said anchorage and said servo-motor, a rigid connection between said spring means and said servo-motor, linkage means connecting said position-controlling element to said spring means at a point on said spring means displaced from said connection between said spring means and said servo-motor, means whereby a load may be applied, said linkage means being of adjustable ratio and said spring means comprising a torsion bar, a cylindrical member surrounding said torsion bar, and means rigidly connecting said torsion bar and said cylindrical member at adjacent ends thereof.

9. A load-sensitive device comprising spring means, a position-controlled servo-motor, a position-controlling element on said servo-motor, an anchorage, a rigid connection between said anchorage and said servo-motor, a rigid connection between said spring means and said servo-motor, linkage means connecting said position-controlling element to said spring means at a point on said spring means displaced from said connection between said spring means and said servo-motor, means whereby a load may be applied to said spring means, a lever forming part of said linkage means, a yielding connecting member extending between said lever and another part of said linkage means, further means for displacing said lever, said linkage means being of adjustable ratio.

10. A load-sensitive device comprising spring means, a position-controlled servo-motor, a position-controlling element on said servo-motor, an anchorage, a rigid connection between said anchorage and said servo-motor, a rigid connection between said spring means and said servo-motor, linkage means connecting said position-controlling element to said spring means at a point on said spring means displaced from said connection between said spring means and said servo-motor, means whereby a load may be applied to said spring means, a lever forming part of said linkage means, a yielding connecting member extending between said lever and another part of said linkage means, a rigid bar connected to said lever, motor means for displacing said bar, said linkage means being of adjustable ratio.

11. A load-sensitive device comprising a torsion bar, a cylindrical metal member surrounding said torsion bar co-axially, means connecting one end of said torsion bar to an adjacent end of said cylindrical member, a first lever connected rigidly to the other end of said cylindrical member and extending at right angles to the axis of said torsion bar, a second lever connected by a link to said first lever, a slot in said second lever, pivot means mounted to slide in said slot, a rack for carrying said pivot means, a pinion in driving engagement with said rack, motor means for driving said pinion, a gear sector for carrying said rack, a guide-way in said gear sector wherein said rack is arranged to slide, means for driving said gear sector through a limited arcuate distance, an hydraulic ram, a connection between said ram and an anchorage, a second connection between another part of said ram and said torsion bar at a point intermediate the ends of the said torsion bar, a slot in said cylindrical metal member through which said second connection passes with considerable clearance, valve means on said hydraulic ram for controlling the supply and exhaust of hydraulic fluid to and from said ram, and connecting means between said valve means and said second lever.

12. Force-producing apparatus, comprising, in combination, a position servomechanism having an output element and a control element; a spring means; a movable output member to which force is to be applied, said output element of said servomechanism being connected by said spring means to said movable output member, connecting means operable by deflection of said spring means to operate said control element of said servomechanism, and further means for adjusting said connecting means to vary the response of said servomechanism to motion of said movable member.

13. Apparatus according to claim 12 in which said servomechanism comprises an hydraulic ram and said control element comprises an hydraulic control valve, in which said connecting means comprises a mechanical linkage having an adjustable pivot point, and in which said further means comprises motive means operable to adjust said pivot point.

References Cited in the file of this patent

UNITED STATES PATENTS

| | | |
|---|---|---|
| 2,366,382 | Burton et al. | Jan. 2, 1945 |
| 2,411,119 | Stephens | Nov. 12, 1946 |
| 2,508,883 | Knowler et al. | May 23, 1950 |
| 2,599,159 | Breedlove | June 3, 1952 |
| 2,725,203 | Blatz et al. | Nov. 29, 1955 |